June 3, 1930.  G. O. DEGENER  1,761,431
ADDING ATTACHMENT FOR TYPEWRITING MACHINES
Original Filed June 10, 1926
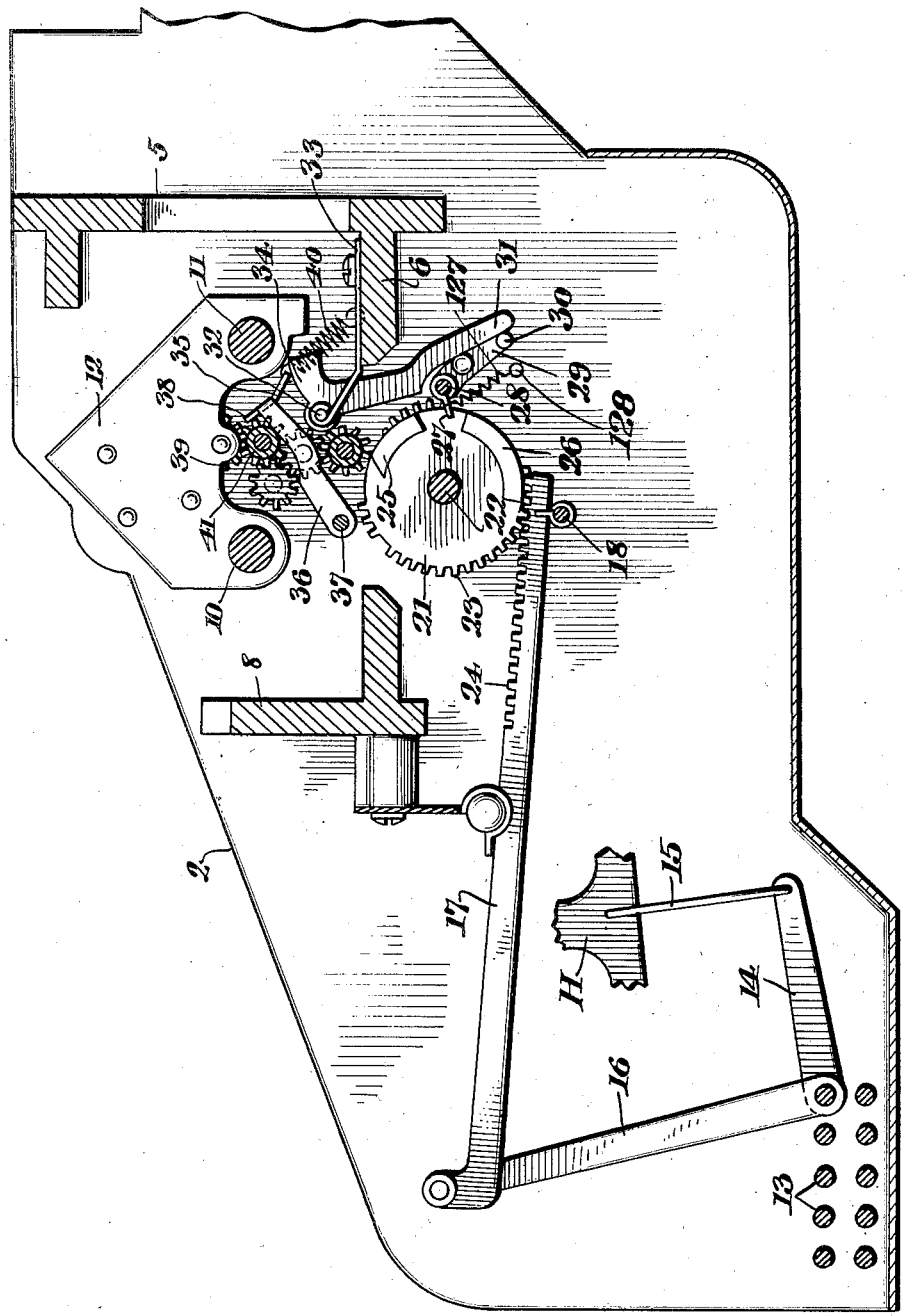

Patented June 3, 1930

1,761,431

UNITED STATES PATENT OFFICE

GUSTAVE O. DEGENER, OF SAN FRANCISCO, CALIFORNIA, ASSIGNOR TO ROYAL TYPEWRITER COMPANY, INC., OF NEW YORK, N. Y., A CORPORATION OF NEW YORK

ADDING ATTACHMENT FOR TYPEWRITING MACHINES

Original application filed June 10, 1926, Serial No. 114,950. Divided and this application filed May 25, 1927. Serial No. 194,133.

This application is a division of my prior Patent No. 1,688,805, granted October 23, 1928.

The invention set forth in this application comprises the employment of a numeral wheel aligning pawl which works directly upon the totalizer wheel that is positioned three or four spaces to the left of the master wheel. This pawl is normally in inoperative position but is brought into engagement with the index wheel upon the depression of a numeral key when the computing mechanism is being operated.

The invention is illustrated as embodied in a machine of the same general character as that shown in my prior Patent No. 1,633,242, granted June 21, 1927, and only so much of the mechanism is shown as is necessary to disclose the construction and operation of the present invention.

The drawing is a vertical longitudinal section through the computing mechanism with parts in elevation.

The invention is preferably embodied in a computing mechanism which is adapted to be used in connection with a typewriting machine but it is not limited in its application thereto. The computing mechanism comprises a frame made up of side members 2 only one of which is shown, and transverse connecting members 5, 6, and 8, which are shown in the drawing. Each numeral key H is connected by a link 15 to an arm 14 mounted on one end of one of a series of rock shafts 13, each of which carries at its other end an upwardly extending crank arm 16 which is pivoted at its upper end to a sliding bar 17. The inner ends of these bars rest upon and are guided by the rod 18.

A plurality of cam gears 21 are mounted on a shaft 22 and each has a portion of its periphery provided with gear teeth 23 which mesh with rack teeth 24 on the sliding bar 17. Each gear member 21 is provided with two cams 25 and 26 the former of which cooperates with parts not shown in this divisional application, and the latter of which cooperates with a member 27 having one edge bent about a pivot rod 28 and fast thereon. This pivot rod 28 has an extending arm 29 having an offset or pin 30 which is normally in engagement with the lower end of a lever 31 which is pivoted on a stud 32 carried by a member 33 which is fast on the shelf 6.

The rotation of a selected cam gear will operate through a train of mechanism including a master wheel 41 and an index wheel 39 to set up the proper number in the totalizer. This mechanism is shown in detail in my prior Patent No. 1,688,805 referred to and needs no detailed disclosure at this time. In itself it has no direct bearing upon the invention herein claimed.

When the cam gear has been moved through the sliding movement of the bar 17 brought about by a depression of a numeral key lever H until the member 27 slides off the lower end of the cam 26, the shaft 28 is returned to its normal position by the spring 127, one end of which is secured to the member 27 and the other to a pin 128 secured in the frame. This causes the pin 30 to contact sharply with the lower end of the lever 31. The upper arm 34 of this lever is normally in contact with a lug 35 on a lever 36 which is pivoted at 37 and which carries a detent pawl 38 in position to engage the teeth of one of the index wheels 39 of the totalizer, which wheel is three or four spaces to the left of the usual master wheel 41. The wheels 39 form part of the register 12, which is mounted for lateral movement on rods 10 and 11, as shown more particularly in said parent case Patent No. 1,688,805, above referred to. A spring 40 is attached to the lug 35 and to the shelf 6 and normally holds the pawl 38 out of engagement with the index wheel. However, when the lever 31 is moved sharply as above mentioned the pawl will move into engagement with said wheel and prevent the same from overthrow or displacement. This will prevent an incorrect number from being set up in the totalizer.

As soon as the cam 26 becomes disengaged from the member 27, the cam gear begins its return movement as set forth in my prior Patent No. 1,688,805 above identified and the other end of the cam 26 comes into engagement with the member 27 and rocks the shaft 28 and arm 29 in the opposite direction or counterclockwise in the figure, thereby positively moving the lever 31 and holding the detent 38 in engagement with the wheel 39 until the return movement of the cam gear 21 and the key lever has been completed.

It is obvious, therefore, that there is a momentary engagement of the pawl 38 with the wheel 39 at the termination of the downward stroke of the key lever which prevents overthrow of the wheel 39 and consequently of the train of gearing. During the return movement of the key lever, at which time the cam wheels are disconnected from the trains of gearing, the detent 38 is positively held in engagement with the wheel 39, thus preventing any accidental displacement at this time from any cause whatever.

It is obvious that the invention may be embodied in widely different types of computing mechanism whether associated with a typewriting machine or not, and the invention is, therefore, to be regarded as limited only by the scope of the appended claims.

I claim as my invention:

1. In a computing machine, the combination of a totalizer having the usual train of mechanism including gears, key actuated devices including an oscillatory gear carrying a cam for operating the totalizer, an alining pawl for the totalizer, and means actuated by the cam on the oscillatory gear for causing the pawl to engage the totalizer at the end of the oscillation in one direction and to hold the pawl thus engaged during the oscillation in the other direction.

2. In a computing machine, the combination of a totalizer having the usual train of mechanism including gears, key actuated devices including an oscillatory gear for operating the totalizer, a cam on the gear, an alining pawl for the totalizer, a spring restrained member put under tension by the cam during the oscillation of the gear in one direction and released at the end of the oscillating for driving the pawl into engagement with the totalizer to aline the same and held by the cam during the oscillation of the gear in the reverse direction so as to retain the pawl in engagement with the totalizer during this movement.

3. In a computing machine, the combination of a totalizer having the usual train of mechanism including gears, key actuated devices including an oscillatory gear for operating the totalizer, a cam on the gear, an alining pawl for the totalizer, a lever for operating the alining pawl, a spring restrained member cooperating with the lever and adapted to be put under tension by the cam during the oscillation of the gear in one direction and to be suddenly released at the end of the oscillation so as to cause the lever to quickly force the alining pawl into engagement with the totalizer to aline the same and adapted to be held by the cam during the oscillation of the gear in the reverse direction so as to retain the pawl in engagement with the totalizer during this movement.

In testimony whereof, I have hereunto subscribed my name.

GUSTAVE O. DEGENER.